(12) United States Patent
Vanderzanden et al.

(10) Patent No.: US 8,076,004 B2
(45) Date of Patent: Dec. 13, 2011

(54) SHEET WITH TRANSITIONAL RELEASE MATERIAL THAT INITIALLY ALLOWS FOR REPOSITIONING FOLLOWED BY RELEASE FAILURE

(75) Inventors: John W. Vanderzanden, Maplewood, MN (US); Scott D. Pearson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 917 days.

(21) Appl. No.: 12/027,500

(22) Filed: Feb. 7, 2008

(65) Prior Publication Data

US 2009/0202772 A1 Aug. 13, 2009

(51) Int. Cl.
*B52B 9/04* (2006.01)

(52) U.S. Cl. ..................... 428/447; 428/195.1

(58) Field of Classification Search ................. 428/195.1
See application file for complete search history.

(56) References Cited

U.S. PATENT DOCUMENTS

| | | | | |
|---|---|---|---|---|
| 4,693,935 | A * | 9/1987 | Mazurek | 428/352 |
| 4,728,571 | A * | 3/1988 | Clemens et al. | 428/352 |
| 4,994,538 | A * | 2/1991 | Lee | 526/279 |
| 5,670,598 | A * | 9/1997 | Leir et al. | 528/28 |
| 6,919,405 | B2 * | 7/2005 | Kinning et al. | 525/191 |
| 2005/0276953 | A1 | 12/2005 | Kitchin et al. | |

FOREIGN PATENT DOCUMENTS

WO WO 00/52080 9/2000

OTHER PUBLICATIONS

David J. Kinning, Bulk Surface, and Interfacial Characterization of Silicone—Polyurea Segmented Copolymers, Journal of Adhesion, vol. 75, pp. 1-26 (2001).

Pelton et al., The Peeling Behavior of Pressure Sensitive Adhesives From Uncoated Papers, Journal of Adhesion vol. 77,pp. 208-308 (2001).

Zhao et al., Paper Properties Affecting Pressure-Sensitive Tape Adhesion, Journal of Adhesion Sci. Technology, vol. 18, No. 14, pp. 1625-1641 (2004).

* cited by examiner

*Primary Examiner* — Mark Ruthkosky
*Assistant Examiner* — Ian Rummel
(74) *Attorney, Agent, or Firm* — Lisa P. Fulton; Trisha D. Adamson

(57) ABSTRACT

Disclosed is a release material applied to a sheet material that provides for temporary repositioning of an adhesive over the release material. Over time the adhesion between the release material and the applied adhesive builds such that the adhesive cannot be removed from the release material without damaging the underlying sheet material. The release material includes an free nitrogen containing basic group. The release material is dispersed on a flexible substrate and the release material allows for repositioning when contacted with a pressure sensitive adhesive, which includes a free carboxylic acid group, for at least 1 minute and not more than 10 minutes.

12 Claims, 1 Drawing Sheet

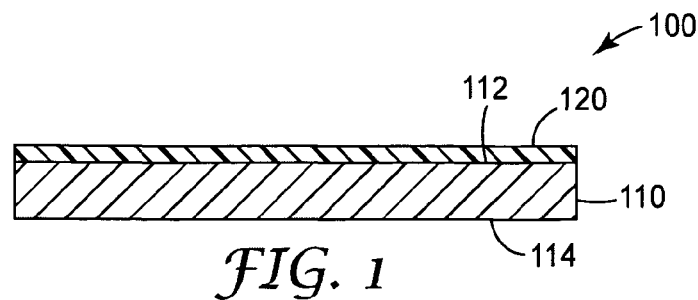
FIG. 1
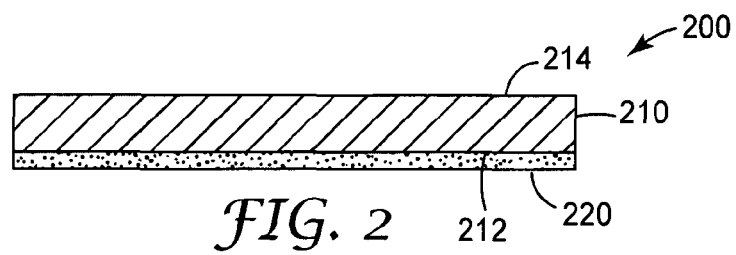
FIG. 2
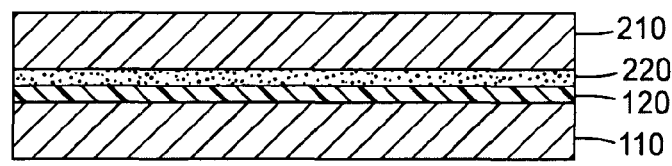
FIG. 3
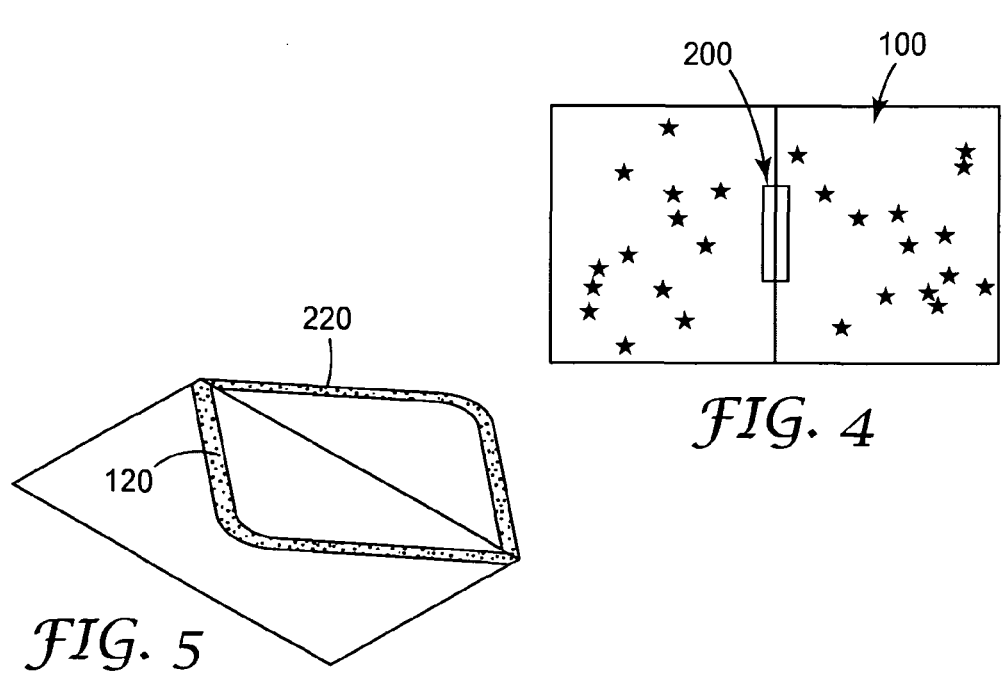
FIG. 4
FIG. 5

SHEET WITH TRANSITIONAL RELEASE MATERIAL THAT INITIALLY ALLOWS FOR REPOSITIONING FOLLOWED BY RELEASE FAILURE

BACKGROUND

The disclosure relates generally to sheet material that provides for temporary repositioning of an adhesive on the sheet material. Over time the adhesion between the sheet material and the applied adhesive builds such that the adhesive cannot be removed from the sheet material without damaging the sheet material.

Many types of decorative sheet materials are available for wrapping gifts or packages. Sheets of patterned paper or plastic foil are usually secured in place using adhesive tape. Typically, once the adhesive tape is applied, removal of the tape from the sheet causes damage to the patterned surface of the paper or foil. Therefore, if errors are made during wrapping, repositioning of the adhesive tape will cause an apparent mark or tear on the paper or foil.

Inclusion of a release material may allow for repositioning of an adhesive over a sheet material. Release materials are typically used in combination with pressure sensitive adhesive constructions, for example, tapes, labels, and other types of adhesive coated sheets. Products of this type must be protected from unintended adhesion to other surfaces. Tapes are typically wound into a roll on their own backing and labels are typically laminated to a release sheet to prevent their accidental adhesion to other surfaces and also to prevent their contamination with air-borne dust and other contaminants. In order to allow a tape roll to be unwound without the undesirable transfer of adhesive to the tape backing, it is customary to provide the tape backing with a coating of a release material, commonly referred to as a low adhesion backsize (LAB), to which the adhesive bonds less firmly. Similarly, the release sheet or liner to which the adhesive coated label is typically laminated, is supplied with a release coating to permit the easy removal of the liner from the label. The LAB or release coating is expected to provide a consistent level of release to the adhesive of interest and to be resistant to aging so that the release level remains stable with time.

However, for an application such as gift wrapping or sealing envelopes, an indefinite ability to remove the adhesive from the sheet material is undesirable. The bond created by the adhesive may unintentionally, or intentionally by another, be released exposing the contents of the package or envelope.

SUMMARY

Therefore, it is desirable to allow for a period of time where repositioning of the adhesive may occur, but following that period of time, the adhesive cannot be repositioned. For an application such as gift wrap, over time the package would be securely fastened by the adhesive and tampering would be evident.

Disclosed is a release material applied to a sheet material that provides for temporary repositioning of an adhesive over the release material. Over time the adhesion between the release material and the applied adhesive builds such that the adhesive cannot be removed from the release material without damaging the underlying sheet material.

In one embodiment, the sheet material comprises a flexible substrate and a polysiloxane release material that includes an free nitrogen containing basic group. The release material is dispersed on the flexible substrate and the release material allows for repositioning when contacted with a pressure sensitive adhesive, which includes a free carboxylic acid group, for at least 1 minute and not more than 10 minutes.

In one embodiment, a gift wrap comprises a paper at least partially containing printed indicia and coated with a polysiloxane release material including a free nitrogen containing basic group. Release failure occurs only after at least 5 minutes of continual contact of a pressure sensitive adhesive that includes a free carboxylic acid group with the release material.

In one embodiment, a sheet material comprises a flexible sheet having a first major surface and a second major surface opposite the first major surface, a release material selected from the group consisting of a polysiloxane-acrylate block or graft copolymers, polysiloxane-urea copolymers, and polysiloxane-urethane copolymers containing at least one basic group selected from the group consisting of N-vinyl pyrrolidone, urea, and urethane, wherein the release material is on the first major surface, and a pressure sensitive adhesive tape that includes an free carboxylic acid group. The adhesive tape is repositionable upon contact with release material on the first major surface of the flexible sheet for at least 1 minutes and not more than 10 minutes.

In another embodiment, a method of applying an adhesive to a flexible substrate comprises providing a pressure sensitive adhesive containing a free carboxylic acid group, providing a polysiloxane release material including a free nitrogen containing basic group disposed on the flexible substrate, contacting the pressure sensitive adhesive continually with the release material for at least 1 minute, optionally repositioning the pressure sensitive adhesive following at least 1 minute, and contacting the pressure sensitive adhesive continually with the release material for at least 10 minutes. Release failure occurs only after at least 5 minutes of continual contact of the pressure sensitive adhesive with the release material.

BRIEF DESCRIPTION OF THE DRAWINGS

FIG. 1 is a side sectional view of one embodiment of a sheet material;

FIG. 2 is a side sectional view of one embodiment of a tape;

FIG. 3 is a side sectional view of one embodiment of the sheet material of FIG. 1 in contact with the tape of FIG. 2;

FIG. 4 is a perspective view of one embodiment of a sheet material secured at a seam by an adhesive tape;

FIG. 5 is a perspective view of one embodiment of an envelope containing a portion containing a release material and a portion containing an adhesive.

While the above-identified drawings and figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of this invention.

The figures may not be drawn to scale.

DETAILED DESCRIPTION

As used in this disclosure "reposition," "repositionable," "repositioning," and "release" means removal of the adhesive containing surface from the release material containing surface with minimal damage to the release material containing surface.

As used in this disclosure "release failure" means removal of the adhesive containing surface from the release material containing surface causes damage to the release material containing surface.

As used in this disclosure "damage" to the release material containing surface may include picking of the ink, fibers, and/or coatings over the substrate, which may include the release material itself and which may or may not be visible; tearing of the substrate; delamination of the substrate; or blocking access to the release material such as from retained adhesive material or the backing material of the adhesive.

FIG. 1 is a side sectional view of one embodiment of a sheet material 100. FIG. 2 is a side sectional view of one embodiment of a tape 200. FIG. 3 is a side sectional view showing the sheet material 100 in contact with the tape 200.

The sheet material 100 comprises a substrate 110 with a first major surface 112 and a second major surface 114, opposite the first major surface 112. The substrate 110 includes a release material 120 applied the first major surface 112 of the substrate 110. The release material 120 can be applied to all or a portion of the first major surface 112 of the substrate 110. In another embodiment, the release material 120 is applied to at least a portion of both the first major surface 112 and the second major surface 114 of the substrate 110.

The tape 200 comprises a backing 210 with a first major surface 212 and a second major surface 214, opposite the first major surface 212. The backing 210 includes an adhesive 220 applied to the first major surface 212 of the backing 210. The adhesive 220 can be applied to all or a portion of the first major surface 212 of the backing 210. In another embodiment, the adhesive 220 is applied to at least a portion of both the first major surface 212 and the second major surface 214 of the backing 210.

The substrate 110 preferably is paper. The paper may include various layers (not Shown such as resins, ink, colorant, opacifier or varnish coatings. While paper is the preferred substrate, it is understood that other materials or combinations of materials may be used for the substrate 110. Such other materials include, but are not limited to, synthetic papers made from polyethylene or polypropylene, nonwoven materials, and plastic films such as polyester, cellulose ester, cellulose ether, polyethylene, polypropylene, polystyrene, polyamide and polyimide films. Typically, the substrate 110 is a thin and flexible film or sheet material.

If the substrate sheet material 100 is intended to be used as a gift wrap or for an envelope, it is preferred that the material is opaque, to prevent viewing through the sheet material 100. Thus, the material selection for the substrate 110 may be affected by the desire to select an opaque or substantially opaque material.

There are a variety of release materials, which include polymers with long straight chain hydrocarbon branches, fluorocarbon copolymers, and silicones and copolymers thereof. One type of the silicone materials is a polysiloxane containing copolymer.

The release material of the present disclosure, when coated on a substrate, initially allows for release of the adhesive. However, as time passes, the adhesion between the release material and adhesive increases, preventing release of the adhesive without concomitant damage. To achieve the necessary building of adhesion between the adhesive and release material, the release material includes a basic group that is free for interacting with an free acid group of the adhesive.

Generally speaking, release materials based on polymers with long straight chain hydrocarbon branches or fluorocarbon copolymers do not have an architecture that allows for an free basic group to interact with an free acid group of the adhesive to achieve adhesion building within a relatively short period of time, such as, for example, within 30 minutes at room temperature conditions. However, surprisingly, applicant has found that thin coatings, for example less than about 0.1 μm, of long straight chain hydrocarbon release materials containing a basic group will readily interact with an acid group available within an adhesive to cause adhesion to build over time. Examples of straight chain hydrocarbon release materials include polyvinyl N-alkyl carbamates, such as disclosed in U.S. Pat. No. 2,532,011, and poly N-alkyl (meth)acrylate copolymers, such as disclosed in U.S. Pat. No. 3,011,988.

Release materials comprising a polysiloxane component and at least one group that is basic in nature will interact with acid groups within an adhesive to cause adhesion to build over time. Representative examples of release compositions include polysiloxane-urea segmented block copolymers, polysiloxane-urethane segmented block copolymers, and polysiloxane-acrylate block or graft copolymers.

Polysiloxane-urea segmented copolymer release materials are disclosed, for example, in U.S. Pat. No. 5,214,119, the disclosure of which is herein incorporated by reference. These release materials may be represented by Formula A.

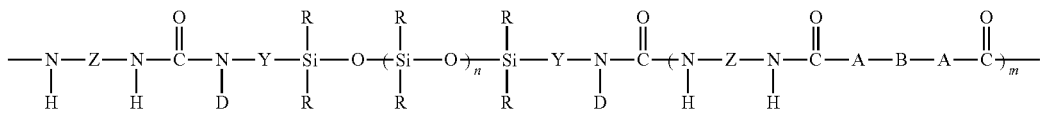

Formula A, where:

Z is a divalent radical selected from the group consisting of phenylene, alkylene, aralkylene and cycloalkylene;

Y is an alkylene radical of 1 to 10 carbon atoms;

R is at least 50% methyl with the balance of the R radicals being selected from the group consisting of a monovalent alkyl radical having from 2 to 12 carbon atoms, a substituted alkyl radical having from 2 to 12 carbon atoms, a vinyl radical, a phenyl radical, and a substituted phenyl radical;

D is selected from the group consisting of hydrogen, and an alkyl radical of 1 to 10 carbon atoms;

B is selected from the group consisting of alkylene, aralkylene, cycloalkylene, phenylene, polyethylene oxide, polypropylene oxide, polytetramethylene oxide, polyethylene adipate, polycaprolactone, polyadiene, and mixtures thereof, and a radical completing a ring structure including A to form a heterocycle;

A is selected from the group consisting of

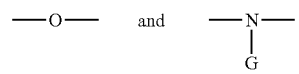

G is selected from the group consisting of hydrogen, an alkyl radical of 1 to 10 carbon atoms, phenyl, and a radical which completes a ring structure including B to form a heterocycle;

n is a number which is 70 or larger, and m is a number which can be 0 to about 25.

The urea and/or urethane linkages in these compounds provide base functionality for interaction with acid functional pressure sensitive adhesives.

Polysiloxane-urethane segmented copolymer release materials are reported, for example in U.S. Pat. No. 5,356,706, the disclosure of which is herein incorporated by reference. These release materials are the reaction product of:

a) a di-omega organo functional dimethylsiloxane oligomer having terminal active hydrogen groups;

b) a carboxyl group bearing monomer having two active hydrogen groups;

c) a diisocyanate; and, optionally d) an organic monomer having two active hydrogen groups.

The urethane linkages in these compounds provide base functionality for interaction with acid functional pressure sensitive adhesives.

Polysiloxane-acrylate block or graft copolymers also may be used as release materials in the present invention. One example of a block copolymer is a linear copolymer having vinyl and siloxane segments, as described in US Pat. No. U.S. Pat. No. 5,202,190, the disclosure of which is herein incorporated by reference. A siloxane-acrylate block copolymer may be prepared by free radical polymerixation of compounds of Formula B, shown below, with one or more vinyl monomers.

$$HS-Z-\underset{\underset{R}{|}}{\overset{\overset{R}{|}}{Si}}-O-(\underset{\underset{R}{|}}{\overset{\overset{R}{|}}{Si}}-O)_n-\underset{\underset{R}{|}}{\overset{\overset{R}{|}}{Si}}-Z-SH$$

Formula B, where:

R are monovalent moieties which can independently be the same or different and are selected from the group consisting of alkyl, aryl, alkaryl, alkoxy, alkylamino, hydroxyl, fluoroalkyl, and hydrogen;

Z are divalent linking groups including but not limited to the following: $C_1$ to $C_{10}$ alkylene, arylene, alkarylene and alkoxyalkylene;

n is an integer of 10 or greater.

Alternatively, a siloxane-acrylate block copolymer may be prepared by free radical polymerization using photoiniferter chemistry, as described in U.S. Pat. No. 5,089,336, the disclosure of which is herein incorporated by reference.

Polysiloxane-acrylate graft copolymers can be prepared either with polymeric vinyl segments grafted to a polymeric siloxane backbone or polymeric siloxane segments grafted to a polymeric vinyl backbone. A siloxane-acrylate graft copolymer of the former architecture may be prepared by free radical polymerization of compounds of Formula C, shown below, with one or more vinyl monomers, as described in U.S. Pat. No. 5,202,190, the disclosure of which is herein incorporated by reference.

$$R_1-\underset{\underset{R_1}{|}}{\overset{\overset{R_1}{|}}{Si}}-O-(\underset{\underset{R_2}{|}}{\overset{\overset{R_2}{|}}{Si}}-O)_n-\underset{\underset{R_1}{|}}{\overset{\overset{R_1}{|}}{Si}}-R_1$$

Formula C, where:

$R_1$ are monovalent moieties which can independently be the same or different and are selected from the group consisting of alkyl, aryl, alkaryl, alkoxy, alkylamino, hydroxyl, fluoroalkyl, and hydrogen;

$R_2$ are monovalent moieties which can independently be the same or different and are selected from the group consisting of alkyl, aryl, alkaryl, alkoxy, alkylamino, hydroxyl, fluoroalkyl, and hydrogen, and —ZSH, wherein Z is a divalent linking group;

Z can include but is not limited to the following: $C_1$ to $C_{10}$ alkylene, arylene, alkarylene and alkoxyalkylene;

n is an integer of 10 or greater.

A siloxane-acrylate graft copolymer of the latter architecture may be prepared by free radical polymerization of compounds of the general formula $X-(Y)_n-Si(R)_{3-m}Z_m$, with one or more vinyl monomers, as described in U.S. Pat. Nos. 4,728,571 and 5,154,962, the disclosure of which are herein incorporated by reference, where:

X is a vinyl group;

Y is a divalent linking group where n=0 or 1;

R is hydrogen, lower alkyl (e.g. methyl, ethyl, or propyl), aryl, or alkoxy;

Z is a monovalent siloxane polymeric moiety having a number average molecular weight above about 1000;

m is an integer of from 1 to 3.

A particular methacrylate-terminated polydimethylsiloxane useful in preparing siloxane-acrylate graft copolymers is shown as Formula D $$\overset{O}{\underset{}{\parallel}}\overset{}{\underset{CH_3}{\overset{}{C}}}=CH_2\text{—O—}\underset{CH_3}{\overset{CH_3}{Si}}\text{—O—}(\underset{CH_3}{\overset{CH_3}{Si}}\text{—O})_n\text{—}\underset{CH_3}{\overset{CH_3}{Si}}\text{—}$$

Formula D, where n is an integer of greater than 10 but typically less than 675.

Representative examples of vinyl monomers for preparing polysiloxane-acrylate copolymers include, for example, methyl acrylate, acrylic acid, vinyl acetate, N-vinyl pyrrolidone, styrene, methyl methacrylate, butyl methacrylate, isopropyl methacrylate, hydroxyl propylacrylate, hydroxyl ethyl acrylate. Base functionalizing of the polysiloxane-acrylate copolymers is introduced by using, for example, N-vinyl pyrrolidone, vinyl acetate, or acrylonitrile, which can interact with acid functional pressure sensitive adhesives.

Variations of the polysiloxane-urea-urethane segmented copolymers may also be used as the polymeric release material. For example, water dispersible sulfo-polyurethane or sulfo-polyurea compositions comprising polysiloxane segments, are described in U.S. Pat. No. 5,679,754, which is herein incorporated by reference. Water based silane terminated polyurethane-urea compositions comprising polysiloxane segments, similar to those described in U.S. Pat. No. 5,356,706, are described in U.S. Pat. No. 5,750,630, the disclosure of which is herein incorporated by reference.

The release compositions may comprise either the defined copolymer alone or such a copolymer blended with compatible homopolymer, copolymer, etc. providing that these blends meet the release requirements.

The presence of the polysiloxane provides for low adhesion levels initially.

The release material 120 can be applied to the substrate 110 by a variety of known coating or printing techniques, such as, for example, roll coating or spray coating. For coating of water borne release materials, it may be advantageous to include wetting aids, e.g. surfactants, and foam control aids, e.g. antifoam agents.

The adhesive 220 is a pressure sensitive adhesive. Generally the adhesive 220 is applied to a backing 210 for forming a tape 200, as shown in the figures. The backing 210 of the tape 200 can comprise a variety of materials or combinations of materials such as paper, plastic films such as polyester, cellulose ester, cellulose ether, polyethylene, polypropylene, polystyrene, polyamide and polyimide films, or foam. Typically the backing 210 is a thin and flexible sheet or film material.

The adhesive 220 of the tape 200 can be used to secure a separate object to the sheet 100 or the adhesive 220 of the tape 200 can be used to secure two portions of the sheet 100 together. For example, FIG. 4 depicts a gift wrap wherein the adhesive tape 200 secures a seam of the sheet 100 together. In another embodiment, the adhesive 220 of the tape 200 may be used to secure an external object, such as a card, bow, or nametag to the sheet 100.

It is understood that the adhesive 220 can be provided in other forms and is not limited to being provided on a tape. For example, FIG. 5 depicts an envelope where the adhesive 220 may be provided directly on the flap portion of the envelope and the release material 120 is provided on a predetermined portion of the envelope, which will mate with the adhesive 220 of the flap. In such an application, the release material 120 of the present disclosure will allow the envelope to be reopened for a period of time, but as the adhesive 220 remains in contact with the release material 120 the adhesion builds preventing repositioning of the adhesive 220. In another embodiment, the adhesive 220 may be provided on an external object, such as a label, bow, or stamp that will be directly fixed to a release material containing surface.

Pressure sensitive adhesives are generally characterized by their properties, which include: (1) aggressive and permanent tack, (2) adherence to a substrate with no more than finger pressure, (3) sufficient ability to hold onto an adherend, and (4) sufficient cohesive strength to be removed cleanly from the adherend.

A variety of pressure sensitive adhesives can be utilized including hot melt adhesives, water based adhesives such as water soluble or water dispersible adhesives, and solvent based or organic soluble adhesives. Descriptions of such adhesives can be found in, for example, "Handbook of Pressure Sensitive Adhesive Technology," D. Satas, ed., Third Edition, Satas & Associates, Warwick, R I, 1999. Such adhesives include, but are not limited to, those based on natural rubbers, synthetic rubbers, styrene block copolymers, polyvinyl ethers, polyacrylates and methacrylates, polyolefins, and silicones.

Pressure sensitive adhesives useful in one embodiment of the present invention include carboxylic acid functional group. In particular, the adhesive belongs to the poly(meth) acrylate class of adhesives. Acrylate pressure sensitive adhesives are produced by either emulsion or solution polymerization. These adhesives generally have a glass transition temperature of about $-20°$ C. or less and may comprise from 40 to 98 weight percent of a $C_4$ to $C_{17}$ alkyl ester component such as, for example, isooctyl acrylate, 2-ethyl-hexyl acrylate, and n-butyl acrylate, 10 to 40 weight percent of a modifying component such as vinyl acetate, and from 0.5 to 20 weight percent of a component with functional groups, for example, acrylic acid, methacrylic acid, and N,N-dimethyl acrylamide. The acrylic pressure sensitive adhesive may be self-tacky or tackified. Useful tackifiers for acrylics are rosin ester resins such as "FORAL 85", available from Hercules, Inc., aromatic hydrocarbon resins such as "PICCOTEX LC-55WK", aliphatic hydrocarbon resins such as "PICCOTAC 95", available from Hercules, Inc., and terpene resins such as "PICCOLYTE A-115", available from Arizona Chemical Co. Other materials may be added for special purposes, including, for example, oils, plasticizers, antioxidants, ultraviolet stabilizers, and pigments.

Pressure sensitive adhesives particularly useful in the present invention include those belonging to the poly(meth) acrylate class of adhesives and containing an acid functional monomer. Suitable acid functional monomers include, for example, acrylic acid and methacrylic acid. In one embodiment, a pressure sensitive adhesive particularly useful includes a polyacrylate adhesive containing an acid functional monomer, such as used in Scotch® Magic™ tape, manufactured by 3M Company, St. Paul, Minn.

In one embodiment, the adhesive is preferably, a polyacrylate pressure sensitive adhesive containing as least one acid functional group, for example, acrylic acid or methacrylic acid. In one embodiment, the release material is preferably, selected from the group, polysiloxane-acrylate block or graft copolymers, polysiloxane-urea copolymers, and polysiloxane-urethane copolymers containing at least one basic group, for example, N-vinyl pyrrolidone, urea, or urethane.

Damage-free initial release of tape is due primarily to the presence of the polysiloxane component of the release material, and the resultant weak interaction between the adhesive and the polysiloxane component of the release material, which comprises much of the release coating surface, as determined by surface analytical techniques, for example, ESCA. The polysiloxane segments are expected to accumulate at the release coating surface prior to adhesive contact, due to their low surface energy. With time, the polymer molecules comprising the release material undergo molecular rearrangement with respect to the adhesive, at the adhesive-release coating interface. In this context, rearrangement means that the position of functional groups within the release material molecules changes relative to the position of functional groups within the adhesive molecules, due to mobility of the polymer chains.

Upon rearrangement, which can occur at room temperature, the basic groups in the release material polymer tend to move closer to the adhesive/release coating interface and the polysiloxane segments tend to move away from the adhesive/release coating interface. This allows the basic groups to be more accessible for interaction with acid groups in the adhesive, with a resultant build in adhesion brought about through acid-base interactions.

Molecular rearrangement is possible provided there is sufficient segmental mobility in the release material polymer at the interface and specific chemical interactions are possible between the adhesive and the basic component in the release material.

When the adhesive 220 initially comes in contact with the release material 120 of the sheet 100, the release material 120 initially allows for repositioning of the adhesive 220. However, maintaining the adhesive 220 in contact with the release material 120 of the sheet 100 causes the acid groups of the adhesive 220 to chemically interact with the basic groups of the release material 120 to cause the adhesion between the adhesive 220 and the release material 120 to rapidly increase with time. Therefore, after sufficient time passes the adhesive 220 is no longer repositionable with respect to the release material 120.

Generally, following contact of the adhesive 220 with the release material 120, the peel force required to remove the adhesive 220 from the release material 120 increases with time. The peel force will increase to a point that the adhesive 220 is no longer repositionable with respect to the release material 120 and damage to the release material containing substrate occurs. In some instances, the adhesion between the adhesive 220 and release material 120 will increase to a point that the resulting separation of the peel is actually delamination of the underlying sheet material.

A variety of factors can affect the peel force that allows for repositioning and the time available for repositioning of the adhesive. The composition of the adhesive and/or release material, the thickness of the adhesive and/or release material, the force initially applied to secure the adhesive to the release material, the composition of the substrate, the modulus of the backing of the adhesive, the rate of removal of the adhesive from the release material, the roughness of the substrate, the substrate internal bond strength, the temperature, and the peel angle are all factors that can affect the peel force that allows for repositioning and the time available for repositioning of the adhesive.

Generally, there is an adhesive peel force associated with causing delamination of the substrate. The measurement of this substrate delamination force can be performed preferably without a release material coated on the substrate. However, the measurement of the substrate delamination force can also be performed with a release material coated on the substrate, since the substrate internal bond strength is generally unaffected by surface energy. In either case, the peel force measurement corresponding to total delamination of the substrate can be considered the substrate delamination force.

The adhesive is initially repositionable. An initial peel force of the pressure sensitive adhesive is preferably less than 60% of a substrate delamination force. In another embodiment, an initial peel force of the pressure sensitive adhesive is preferably less than 35% of a substrate delamination force.

For the period of time that the adhesive is repositionable, the peel force of the pressure sensitive adhesive is preferably less than 85% of a substrate delamination force. Following the period of repositionability, the peel force of the pressure sensitive adhesive increases to greater than 85% of the substrate delamination force. In one embodiment, for the period of time that the adhesive is repositionable, the peel force of the pressure sensitive adhesive is preferably less than 60% of a substrate delamination force. Generally, the period of repositionability is at least 1 minute and up to ten minutes of contact time between the adhesive and the release material.

Different applications will require different times desirable for repositioning of the adhesive. In one embodiment, the adhesive is repositionable for at least 1 minute and for up to 15 minutes of continual contact with the release material. In another embodiment, the adhesive is repositionable for at least 30 seconds and for up to 10 minutes of continual contact with the release material. In another embodiment, the adhesive is repositionable only for at least 1 minute.

When the adhesive remains in contact with the release material, the adhesion will build to a point that release failure occurs when it is attempted to remove the adhesive from the release material. In one embodiment, release failure occurs following 15 minutes of continual contact of the adhesive with the release material. In another embodiment, release failure occurs following 10 minutes of continual contact of the adhesive with the release material. In another embodiment, release failure occurs following 2 minutes of continual contact of the adhesive with the release material.

It is understood that although the above description is with respect to a release material include a basic group and an adhesive material contain a acid group, that instead the release material may include an acid group that is available for interacting with an available basic group of the adhesive. An example of an adhesive containing a basic group is an acrylate copolymer made from isooctyl acrylate (IOA) and acrylamide. An example of a release material containing an acid group is a polysiloxane acrylate based on Formula C, above, whereby one of the monomers includes an acid functional group, such acrylic acid.

Although specific embodiments of this invention have been shown and described herein, it is understood that these embodiments are merely illustrative of the many possible specific arrangements that can be devised in application of the principles of the invention. Numerous and varied other arrangements can be devised in accordance with these principles by those of ordinary skill in the art without departing from the spirit and scope of the invention. Thus, the scope of the present invention should not be limited to the structures described in this application, but only by the structures described by the language of the claims and the equivalents of those structures.

EXAMPLES

Test Method
Peel Force

This test measures the effectiveness of the material as a release agent. A quantitative measure is the force required to remove a flexible adhesive tape from a substrate coated with the release material. A cellulose-backed tape having a 1 mil thick coating of an acrylate based pressure sensitive adhesive, containing acrylic acid co-monomer was used as a test tape (Scotch® Magic™ tape, available from 3M Company, St. Paul Minn.). Three-quarter inch (1.9 cm) wide strips of tape were adhered to coated gift wrap (Scotch® red plaid gift wrap, cat. ID WP65PL Red, available from 3M Company, St. Paul Minn.) using a 2.2 kg roller, passed once over the strip. A tape (Scotch® Magic™ tape) is applied across the end of the gift wrap corresponding to the starting location for the peel test. This "separation tape" was employed so that the leading edge of the paper could not induce paper failure. The bonded laminate was allowed to sit at 70° F. (21° C.) and 50% relative humidity for varying lengths of time and was tested using an IMASS slip/peel tester (Model 3M90, available from Instrumentors, Inc. Strongville, Ohio). The tape strips were peeled at a peel speed specified and a 180° peel angle. The peel force is the average peel force over a 5 second time interval (at a peel speed of 25 inches/minute) or a 2 second time interval (at a peel speed of 90 inches/minute). In each instance there is a 1 second delay before measurements were obtained. A minimum of two samples were tested, and the reported peel force is an average of the values of the individual samples.

Paper Damage

This test measures qualitatively the degree of damage to the substrate resulting from removing a flexible adhesive tape from a substrate coated with the release material following the Peel Force test. Any damage to the paper was noted, which occurred in the form of ink picking and/or paper tear. The paper damage was a visual determination without use of magnifying lenses. The degree of damage was judged using the following guide:

0—no visible damage
1—minimal ink picking
2—moderate ink picking
3—minor paper tear
4—major paper tear Comparative Example Scotch® red plaid gift wrap paper was tested as described above, and the results for the gift wrap paper are reported in both Table 1 (peel speed 25 inches/min.) and Table 2 (peel speed 90 inches/min.). The peel force reported for the Scotch® red plaid gift wrap paper in Table 1 and Table 2 is considered the substrate delamination force.

Example 1

A polysiloxane-urea segmented copolymer (SPU 1) containing 25 wt % of a 5,000 molecular weight amino propyl-terminated polydimethylsiloxane diamine, was prepared as a 12 wt % solution in isopropyl alcohol according to the method described in U.S. Pat. No. 5,214,119. In addition, SPU 1 contained 55 wt % of a 4,500 molecular weight amine-terminated poly(propylene oxide) diamine (Jeffamine® D-4000, available from Huntsman), 15 wt % of isophorone diisocyanate (IPDI, available from Bayer), and 5 wt % of 1,3 diamino pentane (DYTEK$^R$ EP, available from DuPont). The polysiloxane-urea copolymer will be referred to as 25/55/20, indicating 25 wt % polydimethylsiloxane, 55 wt % soft segment, and 20 wt % hard segment (defined as the combined wt % of IPDI and DYTEK® EP chain extender).

The polymer solution was coated on 3M Scotch® red plaid gift wrap paper using a #9 coating rod, followed by drying 5 minutes at 225° F. (107° C.). The coated paper was tested as described above using a peel speed of 25 inches/min., and the results are reported in Table 1.

Example 2

A polysiloxane-urea segmented copolymer (SPU 2) containing 50 wt % of a 5,000 molecular weight amino propyl-terminated polydimethylsiloxane diamine, was prepared as a 12 wt % solution in isopropyl alcohol according to the method described in U.S. Pat. No. 5,214,119. In addition, SPU 2 contained 25 wt % of a 4,500 molecular weight amine-terminated poly(propylene oxide) diamine (Jeffamine® D-4000, available from Huntsman), 18.75 wt % of isophorone diisocyanate (IPDI, available from Bayer), and 6.25 wt % of 1,3 diamino pentane (DYTEK® EP, available from DuPont). The polysiloxane-urea copolymer will be referred to as 50/25/25, indicating 50 wt % polydimethylsiloxane, 25 wt % soft segment, and 25 wt % hard segment (defined as the combined wt % of IPDI and DYTEK® EP chain extender).

The polymer solution was coated and tested as described in Example 1, and the results are reported in Table 1.

Example 3

An example of a release material in which polymeric vinyl segments are grafted to a polymeric siloxane backbone is given here. A polysiloxane-acrylate graft copolymer, containing 34 wt % of an 8,000 molecular weight mercaptopolydiorganosiloxane (KF-2001, available from Shin-Itsu), was prepared as a 30 wt % aqueous solution according to the method described in U.S. Pat. No. 5,202,190. In addition, the copolymer contained 37 wt % N-vinyl pyrrolidone, 25 wt % methyl acrylate, and 4 wt % acrylic acid.

A portion of the polymer solution was mixed with solutions of polyvinyl alcohol (Celvol 205S, available from Celanese) and a silicone polyether surfactant (Q2-5211, available from Dow Coming) in the proportions given below. Polyvinyl alcohol and the silicone polyether surfactant function as wetting agents.

46.6 wt % Polysiloxane-acrylate copolymer solution (30 wt %)
40.8 wt % Deionized water
10.0 wt % Polyvinyl alcohol (10 wt %)
2.6 wt % Silicone polyether surfactant (3.9 wt %)
The resulting solution was coated and tested as in Example 1. The test results are reported in Table 1.

Example 4

An example of a release material in which polymeric siloxane segments are grafted to a polymeric vinyl backbone is given here. A polysiloxane-acrylate graft copolymer, containing 26 wt % of 3-methacryloxypropyl-terminated polydimethylsiloxane macromer, having an number average molecular weight of about 10,000 (X-22-2426, available from Shin-Itsu), was prepared as a 12 wt % solution in a mixture of toluene, isopropanol, and methyl ethyl ketone, according to the method described in U.S. Pat. No. 5,154,962. In addition, the copolymer contained 39 wt % methyl acrylate, 30 wt % N-vinyl pyrrolidone, and 4 wt % acrylic acid.

The polymer solution was diluted to 2 wt % and coated on 3M Scotch® red plaid gift wrap paper using a #3 coating rod, followed by drying 5 minutes at 225° F. (107° C.). The coated paper was tested as described above using a peel speed of 90 inches/min., and the results are reported in Table 2.

Example 5

This example is directed at the class of acrylate copolymers with long straight chain hydrocarbon branches. A particular example is the reaction product of octadecyl acrylate (ODA), a basic vinyl monomer, and one or more other vinyl monomers, described in U.S. Pat. No. 3,011,988. For this example, a copolymer was prepared by free radical polymerization of ODA (51 wt %), acrylonitrile (25 wt %), acrylic acid (13 wt %), and methyl acrylate (11 wt %) in ethyl acetate. A 1.0 wt % polymer solution was coated, as in Example 4, yielding a dry polymer thickness of about 0.07 μm. The samples was tested as in Example 4, and the results are reported in Table 2.

Example 6

This example illustrates the concept of the invention, in which the release material contains an acid group and the adhesive contains a basic group. Following Example 3, a polysiloxane-acrylate graft copolymer, comprising KF-2001 (30 wt %), methyl acrylate (35 wt %), and acrylic acid (35 wt %), was used as the release coating. A 10 wt % solution was coated on 3M Scotch® red plaid gift wrap paper using a #3 coating rod, followed by drying 5 minutes at 225° F. (107° C.). A polypropylene-backed tape having a 1 mil thick coating of an alkyl acrylate based pressure sensitive adhesive containing 4 wt % acrylamide co-monomer, was used as a test tape. The coating was tested as in Example 4, and the results are reported in Table 2.

TABLE 1

| Example | Tape Contact Time (min) | Peel Force (g/0.75 in.) | Peel Force/ Delamination Force | Paper damage |
|---|---|---|---|---|
| Scotch ® red plaid gift wrap | 0.25 | 127 | | 4 |
| 1 | 0.25 | 18 | 0.14 | 0 |
|   | 1 | 43 | 0.34 | 0 |
|   | 2 | 77 | 0.61 | 1 |
|   | 3 | 106 | 0.83 | 3 |
|   | 5 | 109 | 0.86 | 4 |
|   | 10 | 90 | 0.71 | 4 |
| 2 | 0.25 | 7 | 0.06 | 0 |
|   | 5 | 30 | 0.24 | 0 |

TABLE 1-continued

| Example | Tape Contact Time (min) | Peel Force (g/0.75 in.) | Peel Force/ Delamination Force | Paper damage |
|---|---|---|---|---|
|  | 10 | 44 | 0.35 | 0 |
|  | 15 | 104 | 0.82 | 3 |
|  | 20 | 125 | 0.98 | 4 |
|  | 25 | 134 | 1.06 | 4 |
| 3 | 0.25 | 119 | 0.94 | 0 |
|  | 0.5 | 133 | 1.05 | 3 |
|  | 0.75 | 135 | 1.06 | 3 |
|  | 1 | 121 | 0.95 | 4 |
|  | 2 | 98 | 0.77 | 4 |

TABLE 2

| Example | Tape Contact Time (min) | Peel Force (g/0.75 in.) | Peel Force/ Delamination Force | Paper damage |
|---|---|---|---|---|
| Scotch ® red plaid gift wrap | 0.25 | 207 |  | 4 |
| 4 | 0.25 | 71 | 0.34 | 0 |
|  | 1 | 119 | 0.58 | 0 |
|  | 2 | 130 | 0.63 | 1 |
|  | 5 | 127 | 0.62 | 1 |
|  | 15 | 153 | 0.74 | 1 |
|  | 30 | 158 | 0.77 | 1 |
|  | 60 | 175 | 0.85 | 2 |
|  | 120 | 218 | 1.05 | 1 |
|  | 240 | 260 | 1.26 | 2 |
|  | 480 | 277 | 1.34 | 3 |
| 5 | 0.25 | 133 | 0.64 | 1 |
|  | 5 | 142 | 0.68 | 1 |
|  | 30 | 175 | 0.85 | 1 |
|  | 120 | 215 | 1.04 | 3 |
|  | 240 | 218 | 1.05 | 3 |
|  | 480 | 272 | 1.32 | 3 |
|  | 1440 | 283 | 1.37 | 3 |
| 6 | 0.25 | 113 | 0.55 | 0 |
|  | 5 | 204 | 0.99 | 2 |
|  | 15 | 204 | 0.99 | 2 |
|  | 30 | 263 | 1.27 | 4 |
|  | 60 | 221 | 1.07 | 4 |
|  | 120 | 229 | 1.11 | 4 |

What is claimed is:

1. A sheet material comprising:
a flexible paper or nonwoven substrate;
a polysiloxane release material that includes a free nitrogen containing basic group, wherein the release material is dispersed on the flexible substrate;
wherein the release material allows for repositioning when contacted with a pressure sensitive adhesive comprising a poly(meth)acrylate containing a carboxylic acid functional monomer, for at least 1 minute and not more than 10 minutes when the pressure sensitive adhesive was adhered to the release material with one pass of a 2.2 kg roller.

2. The sheet material of claim 1, further comprising printed indicia on the flexible substrate.

3. The sheet material of claim 1, wherein the flexible substrate includes a first major surface and a second major surface, opposite the first major surface, and wherein the first major surface includes the polysiloxane release material and the second major surface is essentially free of adhesive.

4. The sheet material of claim 1, wherein the release material is selected from the group consisting of polysiloxane-acrylate block or graft copolymers, polysilioxane-urea copolymers, and polysiloxane-urethane copolymers containing at least one basic group and wherein the basic group is selected from the group consisting of N-vinyl pyrrolidone, urea, and urethane.

5. The sheet material of claim 1, wherein a peel force of the pressure sensitive adhesive is less than 85% of a substrate delamination force for at least one and up to ten minutes before increasing to greater than 85% of the substrate delamination force.

6. The sheet material of claim 1, wherein a peel force of the pressure sensitive adhesive is less than 60% of a substrate delamination force for at least one and up to ten minutes before increasing to greater than 60% of the substrate delamination force.

7. The sheet material of claim 1, wherein an initial peel force of the pressure sensitive adhesive is less than 60% of a substrate delamination force.

8. The sheet material of claim 1, wherein an initial peel force of the pressure sensitive adhesive is less than 35% of a substrate delamination force.

9. A gift wrap comprising:
a paper at least partially containing printed indicia and coated with a polysiloxane release material including a free nitrogen containing basic group whereby release failure occurs only after at least 5 minutes of continual contact of a pressure sensitive adhesive comprising a poly(meth)acrylate containing a carboxylic acid functional monomer with the release material when the pressure sensitive adhesive was adhered to the release material with one pass of a 2.2 kg roller.

10. The sheet material of claim 9, wherein the release material is selected from the group consisting of polysiloxane-acrylate block or graft copolymers, polysilioxane-urea copolymers, and polysiloxane-urethane copolymers containing at least one basic group and wherein the basic group is selected from the group consisting of N-vinyl pyrrolidone, urea, and urethane.

11. A sheet material comprising:
a flexible paper or nonwoven sheet having a first major surface and a second major surface opposite the first major surface;
a release material selected from the group consisting of a polysiloxane-acrylate block or graft copolymers, polysilioxane-urea copolymers, and polysiloxane-urethane copolymers containing at least one basic group selected from the group consisting of N-vinyl pyrrolidone, urea, and urethane, wherein the release material is on the first major surface;
a pressure sensitive adhesive tape comprising an adhesive comprising a poly(meth)acrylate containing a carboxylic acid functional monomer;
wherein the adhesive tape is repositionable upon contact with release material on the first major surface of the flexible sheet for at least 1 minute and not more than 10 minutes when the pressure sensitive adhesive was adhered to the release material with one pass of a 2.2 kg roller.

12. A method of applying an adhesive to a flexible paper or non-woven substrate comprising:
providing a pressure sensitive adhesive comprising a poly(meth)acrylate containing a carboxylic acid functional monomer;
providing a polysiloxane release material including a free nitrogen containing basic group disposed on the flexible paper or non-woven substrate;
contacting the pressure sensitive adhesive continually with the release material for at least 1 minute;

optionally repositioning the pressure sensitive adhesive following at least 1 minute;
contacting the pressure sensitive adhesive continually with the release material for at least 10 minutes, whereby release failure occurs only after at least 5 minutes of continual contact of the pressure sensitive adhesive with the release material when the pressure sensitive adhesive was adhered to the release material with one pass of a 2.2 kg roller.

* * * * *

UNITED STATES PATENT AND TRADEMARK OFFICE
CERTIFICATE OF CORRECTION

PATENT NO.         : 8,076,004 B2                                        Page 1 of 1
APPLICATION NO.    : 12/027500
DATED              : December 13, 2011
INVENTOR(S)        : John W. Vanderzanden It is certified that error appears in the above-identified patent and that said Letters Patent is hereby corrected as shown below:

IN THE SPECIFICATIONS:

Column 3
Line 44, delete "Shown" and insert -- shown --, therefor.

Column 4
Line 47 (approx.), after "alkyl" delete "radical".

Column 5
Line 27, delete "polymerixation" and insert -- polymerization --, therefor.

Signed and Sealed this
Tenth Day of April, 2012

David J. Kappos
*Director of the United States Patent and Trademark Office*